United States Patent

[11] 3,620,671

| [72] | Inventors | Pierre Maurel;<br>Pierre Duhart, both of Aix En Provence, France |
|---|---|---|
| [21] | Appl. No. | 768,240 |
| [22] | Filed | Oct. 17, 1968 |
| [45] | Patented | Nov. 16, 1971 |
| [73] | Assignee | Compagnie Pechiney<br>Paris, France |
| [32] | Priority | Oct. 25, 1967 |
| [33] | | France |
| [31] | | 125,817 |

[54] PROCESS FOR THE ACID TREATMENT OF ALUMINOUS ORES FOR THE RECOVERY OF ALUMINA
12 Claims, 1 Drawing Fig.

[52] U.S. Cl. .................................................. 23/143, 23/92
[51] Int. Cl. ....................................................... C01b 7/30
[50] Field of Search ........................................... 23/143, 92, 121–123, 32

[56] References Cited
UNITED STATES PATENTS

| 282,878 | 8/1883 | Gardair et al. | 23/92 |
| 744,765 | 11/1903 | Keogh | 23/142 |
| 2,476,979 | 7/1949 | Hoeman | 23/123 |
| 3,484,196 | 12/1969 | Cohen et al. | 23/123 |

FOREIGN PATENTS

| 36-23,308 | 6/1961 | Japan | 23/92 |
| 225,199 | 10/1925 | Great Britain | 23/92 |

Primary Examiner—Oscar R. Vertiz
Assistant Examiner—G. O. Peters
Attorney—McDougall, Hersh, Scott and Ladd ABSTRACT: The recovery of alumina from acid treatment of aluminous ores wherein iron, magnesium and potassium present in the ores are also recovered, including treating the ore with aqueous suplhuric acid solution to extract the solubles, washing the residue with water to extract the complex sulfates of iron, potassium and magnesium and recovering same by crystallization upon concentration, diluting the sulfate liquor with water to reduce the $H_2SO_4$ content to about 500 g. per liter and then cooling to a temperature below 50° C. while saturating with HCl to precipitate hydrated aluminum chloride which is seaprated by filtration, cooling the filtrate while saturating with hydrochloric acid to precipitate sodium chloride which is separated by filtration and heating the remaining filtrate to liberate the hydrochloric acid, concentrating the filtrate to increase the $H_2SO_4$ content to 750–850 g. per liter for recycling in treatment of a new batch of ore and purifying the hydrated aluminum chloride by recrystallization and calcining at a temperature of at least 550° C. to dissociate the aluminum chloride into alumina and hydrochloric acid which can be recovered.

PATENTED NOV 16 1971 3,620,671
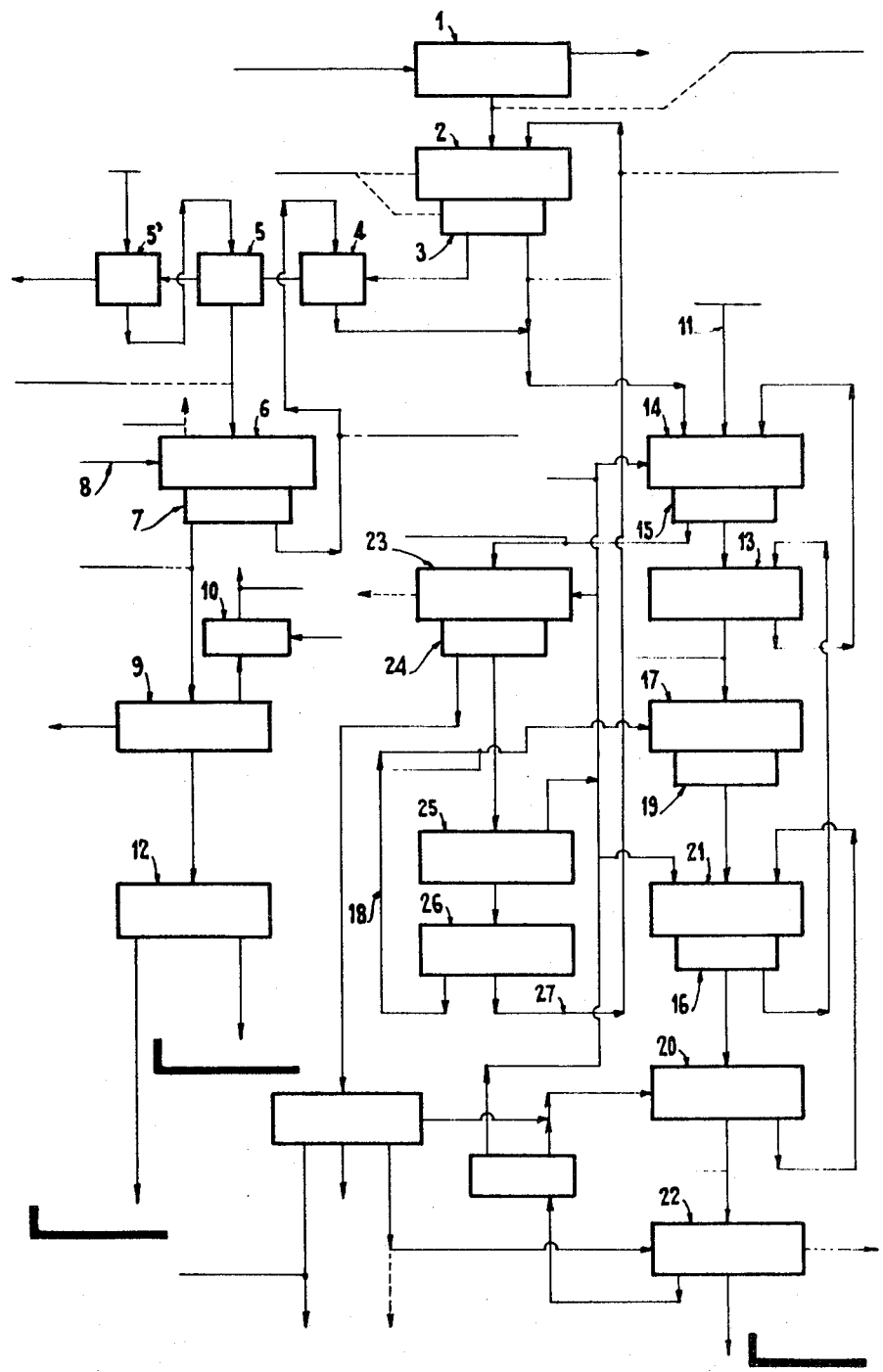
INVENTORS
PIERRE MAUREL·PIERRE DUHART
BY
M'Dougall, Hersh, Scott + Ladd ATTYS

PROCESS FOR THE ACID TREATMENT OF ALUMINOUS ORES FOR THE RECOVERY OF ALUMINA

This invention relates to an industrial process for the treatment of aluminous ores with acid with a view toward isolating alumina in a highly pure form and toward recovering certain other elements present in the ores in a form in which they may commercially exploited. This treatment is applicable to siliceous ores in the form of various clays or mining residues, such as coal schists. Such ores, which are extremely plentiful, also contain large amounts of iron, alkali metals and alkaline earth metals. It is possible by the process of this invention to isolate oxides of iron and magnesium and salts of potassium in forms in which they can be effectively used.

The extraction of alumina, as by the action of acids on ores such as clay, schists, siliceous bauxite, etc., has given rise to extensive research. Numerous processes have been described in technical papers and in patent specifications. The principal problem resides in the removal of impurities which are soluble in the acids. It is also difficult to recover anions, such as $SO_4^-$ or $NO_3^-$, present in the form of salts in free acid form. The effect of other acids, such as solutions of HCl or $SO_2$, on the ore is incomplete.

A solution which is satisfactory both technically and economically or which is likely to find acceptance in industry has not yet been proposed.

In the French Pat. No. 574,983 or British Pat. No. 225,199, description is made of the treatment of such ores with sulfuric acid and the conversion of the aluminum sulfate produced into hydrated aluminum chloride by the addition of hydrochloric acid. The saturation of a solution of aluminum sulfate of the correct concentration with gaseous hydrogen chloride causes the hydrated aluminum chloride to precipitate while most of the other metal ions remain in solution. The hydrated aluminum chloride may be converted into alumina by calcination with the regeneration of hydrochloric acid.

The process of the aforementioned French and British patents does not provide for the removal of the impurities entrained by the ore except for the removal of iron by crystallizing iron sulfate from the acid liquor which is to be recycled. Thus the impurities accumulate in the recycled acid liquor, making the process wholly unworkable. The French and British patent specifications also do not give any details with respect to the composition of the circulating liquors or the yields obtained. Thus while of theoretical interest, the process of the French and British patents has not achieved commercial application.

The industrial problem is highly complex. To be commercially acceptable, the manufacturing process should constitute a continuous operation wherein all of the elements introduced from the ore are withdrawn either in the form of pure alumina, in the form of removable byproducts or in the form of useless products which can be ultimately discarded. At the same time, the alumina produced should be at least as pure as the alumina obtained by alkaline processes and its production should be achieved at comparable cost.

It is an object of this invention to provide a method and means for the acid treatment of aluminum ores in a continuous process to yield alumina in a highly purified form, which enables recovery of byproducts, which others of the elements present in the ore are capable of recovery in a highly usable form, and in which the alumina can be produced in high yield and at low cost.

The process of this invention meets these various requirements. It comprises a continuous treatment cycle for the ore in which, inter alia, the composition of the circulating liquids, the reaction temperatures, the location of the inlets for the starting materials such as ore, water and acids, and the location of the outlets for the residuals, intermediate and end products determine the conditions of the cycle. The process embodying the features of this invention comprises the following stages:

1. crushing optionally calcining and then digesting the ores with a hot aqueous solution of sulfuric acid containing from 500 to 1,000 g. per liter, and preferably from 750 to 850 per liter, of uncombined $H_2SO_4$ in sulfate form, and impurities emanating from the continuous recycling of the solution:

2. dissolving the compounds which are insoluble in the liquor used for treatment, by washing them with water, and precipitating such compounds by concentrating the liquor to recover the iron, magnesium and potassium therein:

3. diluting the solution of sulfates produced by the digestion treatment (1) in order to reduce its free $H_2SO_4$ content to below 650 g. per liter, and preferably to within the range of 500 to 550 g. per liter, and cooling the liquor to below 50° C. while the solution is saturated with gaseous hydrogen chloride throughout the cooling step to precipitate the aluminum therein in the form of its hydrated chloride which is separated by filtration;

4. cooling the filtrate while keeping it saturated with hydrochloric acid so as to precipitate sodium chloride, and removing the precipitate sodium chloride by precipitation;

5. heating the filtrate to release therefrom substantially all of the hydrochloric acid, partly in anhydrous form and partly in the form of an aqueous solution;

6. concentrating the latter filtrate so as to adjust its $H_2SO_4$ concentration to between 500 and 1000 g. per liter, and preferably between 750 and 850 g. per liter, and then recycling this concentrated solution for the initial treatment of ore;

7. purifying the hydrated aluminum chloride by one or more crystallizations from aqueous solution of hydrochloric acids; and 8. calcining the aluminum chloride at a temperature of at lease 500° C. to effect dissociation into alumina and hydrochloric acid the latter of which is recovered partly in anhydrous form and partly in the form of a concentrated solution.

It is possible by means of this process to extract almost 90 percent of the alumina present in the mineral in purified form. In addition, the process yields, as secondary products, more than 80 percent of the iron and magnesium present in the ore in the form of their corresponding oxides and more than 80 percent of the potassium present in the form of potassium sulfate.

It is a feature of this invention that the various stages of the process are joined together. After a transition period, during which equilibrium is established, the equilibrium is no longer displaced and the quantities of the products which are eliminated at certain points of the cycle, including losses, are equivalent to those which are introduced at other points of the process in the form of ore, acids and water.

The higher the concentration of elements in the circulating liquids, the easier it becomes to remove these elements from the circuit, although it becomes more difficult to isolate the alumina in purified form in the presence of a high concentration of impurities in the solution. Accordingly the process should be carried out with the concentration of elements within fairly narrow limits. In this way, the impurities can be removed while enabling recovery of pure alumina.

The selection of the concentration of elements in the solutions is dependent somewhat on the composition of the ore to be treated and is limited by the solubility in the liquid phase of the various compounds which are formed in the course of these operations.

The degree to which the iron present in the ores is oxidized is of significance in the process for extraction of alumina. The process of this invention can be used with ores in which the iron oxide is in a state of maximum valency, i.e. $Fe^{+++}$. If the ore contains ferrous iron, the cycle of operation commences with the calcining of the ore in an oxidizing atmosphere to convert ferrous iron to the ferric state. Calcination is carried out in a manner to eliminate all of the elements or compounds, such as carbon or sulfides, which may act as reducing agents during the subsequent operations.

In the cycle of operations forming the subject of this invention the ferric iron is precipitated in the form of a double sulfate or iron and potassium if the liquor contains a sufficient quantity of potassium. If the quantities of $K_2O$ or $Fe_2O_3$, which are dissolved during the treatment, are inadequate to precipitate the double sulfate. It is possible to add more iron or more potassium sulfate to the liquor. These additions may be derived either wholly or in part from products recovered from the cycle.

For simplicity, the flow plan will be described as an interrupted sequence of operations, although the process is a continuous process.

The ore which contains silica, aluminum, iron, alkaline earth metals Mg and in some cases Ca), alkali metals (K and Na), titanium, sulfur and in general a small proportion of other elements, is crushed and then calcined in an oxidizing atmosphere to eliminate water, free carbon, volatile anhydrides, such as $CO_2$, and to convert the sulfides to sulfates and the compounds of iron to ferric oxide.

The calcined ore is crushed and then treated with a hot concentrated solution of sulfuric acid. Since this solution is continuously recycled, it contains in solution the sulfates of the various metals present in the ore. The free $H_2SO_4$ content of the solution should be within the range of 500 to 1000 g. per liter, and preferably 750 to 850 g. per liter. The ore is treated at atmospheric pressure and at about the boiling point temperature of the solution for a period of 1 to 4 hours and the liquid phase is then separated from the solid phase. The solid phase contains all of the silica, almost all of the titanium, most of the iron, potassium and alkaline earth metals and part of the ore which is unaffected by the sulfuric acid. The solid phase is washed with water in countercurrent flow in order to remove compounds which are insoluble in the treatment liquor but soluble in water. All of the silica and most of the titanium are thus eliminated as residues. Most of the iron, potassium magnesium and a little titanium are dissolved in the washing liquor. The liquor thus obtained in concentrated in order to crystallize the sulfates which are calcined. The potassium sulfate, which is not dissociated during this calcination step is recovered by lixiviation. The iron oxides containing Mg and a little $TiO_2$ may be commercially exploited.

The liquid sulfuric acid phase resulting from the treatment of the ore consists of an acid solution of aluminum sulfate which contains as impurities a little iron, magnesium, alkali metals and a very small quantity of titanium. The quantity of ore is calculated in such a way that the $Al_2O_3$ content of the solution will be below a limit value corresponding to the precipitation of aluminum sulfate. This limiting value, which is governed by the composition of the liquor and particularly the $H_2SO_4$ content, is generally below 70 g. per liter.

The liquor resulting from the treatment of the ore is diluted with water or with hydrochloric acid solution from the subsequent washing of the chloride in an amount to reduce its $Al_2O_3$ content to less than 55 g. per liter. It is then cooled to a temperature below 50° C. and preferably to a temperature within the range of 40°–45° C. While it is being cooled, the solution is kept saturated with gaseous hydrogen chloride, either in the form of pure hydrogen chloride or hydrogen chloride diluted with air, so that the balanced reaction corresponds to the following:

$$Al_2(SO_4)_3 \cdot 6HCl + 12H_2O \rightleftharpoons 2(AlCl_3 \cdot 6H_2O) + 3H_2SO_4$$

The reaction takes place substantially completely from left to right without precipitation of aluminum sulfate.

The metals other than aluminum which are present in the sulfuric acid solution remain in solution during this treatment while the hydrated aluminum chloride is precipitated in almost pure form.

Separation of the crystals of hydrated aluminum chloride leaves a sulfuric acid solution which is poor in aluminum. Some of the sodium present therein is precipitated in the form of sodium chloride by cooling the solution while keeping it saturated with anhydrous hydrochloric acid. The extent to which the temperature is reduced depends somewhat upon the quantity of sodium that enters into solution during treatment of the ore. The reduction in temperature is generally about 5° C. The acid-liquid phase, remaining after separation of the sodium chloride by filtration, is heated in order to eliminate most of the HCl in the form of an anhydrous gas and it is then concentrated in order to remove the remainder of the HCl in the form of an aqueous solution. This leaves a hot concentrated solution of sulfuric acid containing an appreciable quantity of sulfates, alkali and alkaline earth metals, aluminum, magnesium and a small quantity of iron sulfate and titanium sulfate. This solution is used to make up a part of the liquor employed in the treatment of the ore in a fresh cycle of operations.

The solid hydrated aluminum chloride that is separated from the chlorosulfonic hydrochloric and sulfuric acid solution is purified by dissolution and then precipitation by saturating the liquors with gaseous hydrogen chloride. This operation may be repeated several times. The countercurrent principle is preferably employed because it involves hardly any losses.

The pure hydrated aluminum chloride obtained is converted to alumina by thermal decomposition:

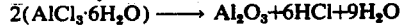

$$2(AlCl_3 \cdot 6H_2O) \longrightarrow Al_2O_3 + 6HCl + 9H_2O$$

The hydrochloric acid released during dissociation is recovered in anhydrous form and partly in the form of a solution. This acid, like the acid recovered during the removal of gas from the sulfuric acid solution, can be recycled for the crystallization and washing of the hydrated aluminum chloride. Although dissociation is almost complete at 550° C., heating may be continued up to about 1,100° C., especially when it is desired to obtain alpha alumina for the production of aluminum.

The characteristic features of the invention are as follows:

a. The elements: iron, potassium and magnesium are completely removed from the circuit used for washing the solid plate remaining after treatment of the ore with sulfuric acid. This solid phase contains the double sulfate of iron and potassium which is relatively insoluble in concentrated sulfuric acid but soluble in the dilute acid.

b. All of the sodium remains in the sulfuric acid solution. It is eliminated from the circuit only after precipitation of the sodium chloride in the chlorosulfonic solution which is kept saturated with hydrochloric acid, such elimination being effected during reduction in temperature, the extent of which depends on the quantity of sodium dissolved during treatment of the ore. This drop in temperature is generally about 5° C.

c. Since the hydrated aluminum chloride is much less soluble than the other metal chlorides in the sulfuric acid solution saturated with hydrochloric acid or in water saturated with hydrochloric acid, it is substantially completely separated from the other cations during the first precipitation in the sulfuric acid medium and may then be purified by one or more additional crystallizations.

d. the purity of alumina obtained by thermal dissociation of the chloride is quite remarkable. After only one recrystallization, as described above, analysis of the alumina shows the following impurities in parts per million: Ca less than 100, Na less than 40, K less than 40, Si less than 30, Mg less than 50, Zn less than 10, Cu less than 10, Fe less than 30, Ti, V, Pb, Mn, Co and Sn less than 5 in each case.

e. Some of the elements separated from the ore during treatment are without any commercial value and are discarded. This is the case with the constituents which are insoluble in the water used to wash the residues which consist of silica, titanium, compounds of calcium and those parts of the ore that are unaffected by sulfuric acid. It is also the case with sodium chloride. On the other hand, iron oxide and potassium sulfate are recovered as useful byproducts.

In order to recover these byproducts, a dilute sulfuric acid solution, containing Fe, Al, Mg and K as principal cations, is removed from one of the residue-washing stages. This solution is concentrated by evaporation, allowed to crystallize and filtered. The filtrate is returned to the residue-washing circuit.

In one preferred embodiment, all the effluent is removed from the second washing stage and the purified filtrate is returned to the first washing stage.

The crystallized phase separated after concentration from the waters used to wash the sludges and for filtration consists of a mixture of sulfates of iron, potassium and magnesium which contains only small quantities of aluminum sulfate and very small quantities of titanium sulfate. This mixture is calcined at elevated temperature, preferably 1,000°–1,100° C., in order to dissociate the sulfates of iron and magnesium, while the potassium sulfate remains in the form of a salt. The sulfuric anhydride obtained by dissociation is itself partly dissociated into $SO_2$ and $O_2$ which are converted into $SO_3$ in a small catalytic unit. The calcination residue is washed with water to dissolve the potassium sulfate which may then be separated by crystallization. In this way, 80 percent of the potassium present in the ore is recovered in the form of a crystallized sulfate.

The oxides of iron and magnesium are in the form of a mixture which contains only a little aluminum and titanium This mixture of oxides may be directly used in ferrous metallurgy. It would also be possible to obtain an iron oxide which is substantially free of magnesium by influencing the temperature at which the sulfates are calcined by processes known per se. Approximately 80 percent of the iron, magnesium and potassium which may be present in aluminum ores are recovered; the recovery of these metals is of importance in the economics of the process.

The following example is intended to illustrate a complete detailed flow sequence of the process according to the invention for the production of alumina. The concentrations and temperatures of the circulating liquids and the yields in which the main elements are obtained at each point of the cycle are given. Although this example is with reference to a particular ore, the process is of general significance and may be applied with only slight modifications to any one of the common alumina-yielding ores, including clays and schists.

The sequence described in this example corresponds to a balanced operation, i.e., after the cycle had reached stabilized conditions, that is for a period long enough for the compositions of the circulating liquids not to vary during the run, and for the quantities of elements removed from the circuit, including losses, to be equivalent to those introduced into the circuit in the form of ore or additional starting materials intended to compensate for losses.

The operating cycle is illustrated in the accompanying drawing which is a flow sheet of one embodiment of the process of the invention which can be carried out as a continuous operation, although in order to make it easier to understand it is described stage by stage as if it were noncontinuous.

EXAMPLE

The ore used is a schist of the type remaining in the mining of coal. It contains a mixture of ferrous iron Fe++ and ferric iron Fe+++ and of carbonaceous residues which would reduce the iron during the treatment with sulfuric acid. The cycle is therefore started by crushing it and calcining it in air, as shown at 1 in the drawing. The ore contains carbon sufficient to make it unnecessary to add fuel after the reaction has started.

The calcination of 5,140 kg. of crude dried schists yields 4,200 kg. of calcined ore containing: 2,369 kg. of $SiO_2$, 1,154 kg. (26.8 percent) of $Al_2O_3$, 253 kg. of $Fe_2O_3$, 206 kg. of $K_2O$, 80 kg. of MgO, 45 kg. of $TiO_2$, 54 kg. of $Na_2O$, and 59 kg. of miscellaneous components. In stage 2, the calcined ore is treated at 140° C. with 18.7 m³ of an aqueous recycled sulfuric acid solution containing 13,557 kg. of $SO_3$, 249 kg. of $Na_2O$, 228 kg. of MgO, 155 kg. of $Al_2O_3$, 153 kg. of $K_2O$, 48 kg. of $Fe_2O_1$1 and 11 kg. of $TiO_2$.

Treatment is continued with stirring for 2 hours, followed by filtration in stage 3. The solid residues, wet with mother liquors, are passed through three successive washing stages 4, 5 and 6. 2,786 kg. of residues, which are subsequently discarded, issue from the last of these washers which is fed with pure water. Such residue contains 2,369 kg. of $SiO_2$, 117 kg. of $Al_2O_3$, 42 kg. of $Fe_2O_3$, 41 kg. of $TiO_2$, 33 kg. of $K_2O$, 17 kg. of $SO_3$, 14 kg. of MgO and 1 kg. of $Na_2O$.

Accordingly, all the silica, most of the titanium corresponding to the untreated ore, and a small proportion of the ore that is unaffected by sulfuric acid are removed at this stage.

The washing solution is passed in countercurrent flow to the residues from the second washing stage 5 where it becomes laden with soluble elements. The liquid issuing from this second washing stage 5 has a volume of 8.42 m³ and contains 2,965 kg. of $SO_3$, 234 kg. of $Fe_2O_3$, 229 kg. of $Al_2O_3$, 208 kg. of $K_2O$, 140 kg. of MgO and 6 kg. of $TiO_2$.

This solution is transferred to an evaporator 6 where it is concentrated until its boiling temperature reaches 122° C. under atmospheric pressure. The crystals which precipitate out are separated by filtration. Thy are washed on the filter with 50 percent by weight sulfuric acid, corresponding to 350 kg. of $SO_3$.

a. The solid residue weighs 1,300 kg. and contains 603 kg. of $SO_3$, 210 kg. of $Fe_2O_3$, 170 kg. of $K_2O$, 66 kg. of MgO, 11 kg. of $Al_2O_3$, and 4 kg. of $TiO_2$.

In stage 9 this residue is calcined at around 1,000° C. in order to dissociate the sulfates of iron, magnesium and aluminum. A mixture of $SO_2$ and $SO_3$ corresponding to 448 kg. of $SO_3$ is collected during this operation. This mixture, to which some $SO_2$ is added in order to compensate for the acid losses, is converted into sulfuric acid in a catalytic unit 10. Accordingly, it is possible in this way to produce sulfuric acid corresponding to 650 kg. of $SO_3$ which is introduced into the circuit at points 8 and 11.

The product of calcination is taken up in hot water in a quantity sufficient to dissolve the potassium sulfate which is recovered by crystallization. The sulfate thus obtained contains 170 kg. of $K_2O$.

The washed oxides contain 210 kg. of $Fe_2O_3$, 66 kg. of MgO, 11 kg. of $Al_2O_3$ and 4 kg. of $TiO_2$.

They may be directly used in ferrous metallurgy. From 82 to 83 percent of the iron, magnesium and potassium present in the treated ore are thus recovered in a commercially usable form.

b. The concentrated liquid phase separated from the crystallized sulfates represents a volume of 5.06 m³ and contains 2,712 kg. of $SO_3$, 218 kg. of $Al_2O_3$, 74 kg. of MgO, 38 kg. of $K_2O$, 24 kg. of $Fe_2O_3$ and 2 kg. of $TiO_2$. It is delivered to the inlet of the first washing stage 4, its main function being to displace the mother liquors with which the residues are impregnated. The effluent from the washing stage 4 has a volume of 5.74 m³ and contains 3,541 kg. of $SO_3$, 293 kg. of $Al_2O_3$, 72 kg. of $Na_2O$, 39 kg. of $K_2O$, 12 kg. of $Fe_2O_3$, 9 kg. of MgO and 4 kg. of $TiO_2$.

The effluent is added to the liquid phase separated from the residues after treatment whose volume is 14.04 m³ and which contains 9,716 kg. of $SO_3$, 881 kg. of $Al_2O_3$, 219 kg. of MgO, 209 kg. of $Na_2O$, 114 kg. of $K_2O$, 36 kg. of $Fe_2O_3$ and 7 kg. of $TiO_2$.

Concentrated sulfuric acid corresponding to 300 kg. is added to the resulting mixture at 11 and a concentrated aqueous solution of hydrochloric acid resulting from the washing at 13 of the first crystals of aluminum chloride is also added.

The liquid is cooled at 42° C. At the same time, anhydrous hydrochloric acid is introduced in an amount for saturation in the stage 14, corresponding to 3,270 kg. of HCl. During this operation, most of the aluminum is precipitated in the form of the hydrated chloride which is separated from the mother liquors by filtration or hydroextraction in a stage 15. The first crystals are washed with an aqueous hydrochloric acid solution which is used as a mother liquor in the following crystallization stage 16.

The following are obtained after separation:

On the one hand, 9.6 m³ of washing liquor 13 is obtained containing 3,600 kg. of HCl, 450 kg. of $SO_3$, 18 kg. of MgO, 12 kg. of $Al_2O_3$, 6 kg. of $Na_2O$, 3 kg. of $Fe_2O_3$, 2 kg. of $K_2O$ and 0.2 kg. of $TiO_2$, which is added to the sulfate solution before the first chlorination 14 as explained above. On the other hand, 4,770 kg. of hydrated chloride is obtained containing 2,407 kg. of HCl, 1,009 kg. of $Al_2O_3$ and 80 kg. of $SO_3$. These crystals are purified by a second crystallization. For this purpose they are dissolved in a stage 17 at 50° C. in 5.4 m³ of an aqueous solution containing 430 kg. of hydrochloric acid obtained from another part 18 of the circuit. This is followed by filtration at 19 in order to eliminate any traces of solid impurities which the solution may contain. The liquid used in stage 20 to wash the crystals from the second precipitation is then added, and the filtrate saturated at 40°-45° C. with 1,770 kg, of gaseous hydrochloric acid, which also causes the hydrated chloride to precipitate at 21, is also added.

This is followed by filtration at 16 and washing at 20 with 3.04 m³ of a 35 percent HCl solution obtained by the thermal dissociation of the aluminum chloride. A liquid phase of 3.04 m³ is obtained which is added to the chloride solution before the second precipitation 21 as explained above, together with a solid phase weighing 4,680 kg. and containing 989 kg. of $Al_2O_3$ and 2,320 kg. of HCl, the remainder being water. This recrystallized, highly pure chloride is then calcined in order to dissociate the chloride into alumina, hydrochloric acid and water. Dissociation is carried out at 600° C. The impurity contents of the resulting alumina are extremely low as specified above.

The filtrate separated at 15 from the aluminum chloride from the first crystallization consists of a chlorosulfonic solution with a volume of 27.12 m³, containing 13,557 kg. of $SO_3$, 4,461 kg. of HCl 281 kg. of $Na_2O$, 228 kg. of MgO, 185 kg. of $Al_2O_3$, 153 kg. of $K_2O$, 48 kg. of $Fe_2O_3$ and 11 kg. of $TiO_2$.

This solution is cooled to 37° C. while keeping it saturated with hydrochloric acid, introduced in anhydrous form in a quantity of 260 kg. (stage 23). A mixture of aluminum chloride and sodium chloride is precipitated weighing 185 kg. and containing 32 kg. of $Na_2O$, 23 kg. of $Al_2O_3$ and 90 kg. of HCl which is filtered at 24. It is possible, by calcining these crystals, to recover 51 kg. of hydrochloric acid and 21 kg. of alumina which is separated by washing from the sodium chloride (30 kg. of $Na_2O$ and 36 kg. of HCl). The sodium chloride solution is discarded while the alumina is taken to a calcination furnace.

The hydrochloride and sulfuric acids aqueous solution separated from the sodium chloride by filtration at 24 has a volume of 27.3 m³ and contains 13,557 kg. of $SO_3$, 4,630 kg. of HCl 249 kg. of $Na_2O$, 228 kg. of MgO, 155 kg. of $Al_2O_3$, 153 kg. of $K_2O$, 48 kg. of $Fe_2O_3$ and 11 kg. of $TiO_2$.

It is possible, by heating this solution, to liberate 4,200 kg. of hydrochloric acid in anhydrous form and then, by concentrating the residue at 26, to distill 5.4 m³ of hydrochloric acid solution 18 containing 430 kg. of acid which is used to dissolve the crude hydrated aluminum chloride, as explained above.

The concentrated solution 27, having a volume of 18.7 m³, contains 13,557 kg. of $SO_3$, 249 kg. of $Na_2O$, 155 kg. of $Al_2O_3$, 153 kg. of $K_2O$, 228 kg. of MgO, 48 kg. of $Fe_2O_3$ and 11 kg. of $TiO_2$. This recycling liquor may be used to treat a fresh batch of ore.

The 4,200 kg. of anhydrous hydrochloric acid, recovered at 25, to which are added 1,050 kg. of anhydrous acid liberated by the dissociation of the hydrated aluminum chloride and 50 kg. of anhydrous acid liberated by dissociation of the sodium residue, supply the various chlorination sites which insure precipitation of the aluminum chloride and sodium chloride. On the other hand, the rest of the acid is recovered in the form of an aqueous solution which may be used for recrystallization and for washing the hydrated aluminum chloride.

1,010 of pure alumina corresponding to 86 percent of the aluminum in the ore, 315 kg. of pure potassium sulfate (82 percent), 390 kg. of a mixture of oxides of iron and magnesium of low aluminum and titanium content, which may be directly used in metallurgy, corresponding to 82 percent of iron and 82 percent of magnesium in the ore, are isolated.

It will be understood that changes may be made in the details of formulation and operations without departing from the spirit of the invention especially as defined in the following claims.

We claim:
1. A process for the treating of aluminous ores for the production of purified alumina, recovery of iron, magnesium and potassium and the removal of silicon, titanium, sodium and other elements present in the ore comprising:
   1. treating the ore with hot aqueous sulfuric acid solution containing 750–850 g. per liter of $H_2SO_4$ and metal sulfates resulting from the continuous recycling of the solution in the system;
   2. separating the sulfuric acid liquor with the solubles dissolved therein from the residue to provide a residue portion and a liquor portion;
   3. washing the residue with water to dissolve out the water soluble magnesium sulfate and the sulfates of iron and potassium and separating the wash water with the solubles dissolved therein from the remaining solids;
   4. concentrating the aqueous wash of step 3 to crystallize out metal sulfates and separating the crystallized metal sulfates from the filtrate and adding the filtrate to the liquor portion of step 2;
   5. diluting the sulfuric acid liquor with water or an aqueous solution of HCl to reduce the $H_2SO_4$ content to less than 500 g. per liter;
   6. saturating the liquor with anhydrous HCl while cooling to a temperature below 50° C. to precipitate hydrated aluminum chloride;
   7. separating the precipitate from the filtrate;
   8. cooling the filtrate of step 7 while saturating with hydrochloric acid to precipitate sodium chloride;
   9. separating the precipitated sodium chloride from the filtrate;
   10. heating the filtrate remaining after removal of the sodium chloride to liberate hydrochloric acid;
   11. concentrating the filtrate to increase the sulfuric acid content to within the range of 750–850 g. per liter;
   12. recycling the resulting concentrated sulfuric acid solution for the treatment of a new batch or ore;
   13. purifying the hydrated aluminum chloride by recrystallization; and
   14. calcining the aluminum chloride at a temperature of at least 550° C. to dissociate the aluminum chloride into alumina and HCl

2. The process as claimed in claim 1 in which the ore is crushed prior to treatment with the aqueous sulfuric acid solution.

3. The process as claimed in claim 1 in which the ore is calcined prior to treatment with the aqueous sulfuric acid solution to convert ferrous iron into ferric iron.

4. The process as claimed in claim 1 in which the recrystallization of hydrated aluminum chloride for purification is carried out in an aqueous hydrochloric acid solution.

5. The process as claimed in claim 1 in which the hydrochloric acid resulting from the calcination of the aluminum chloride is recovered and recycled partly in anhydrous form and partly in the form of a concentrated solution.

6. The process as claimed in claim 1 in which the mixture of the sulfates of iron, magnesium and potassium from step 4 is calcined at a temperature of 1,000°–1,100° C. to dissociate the sulfates of iron and magnesium and then washing with water to separate the potassium sulfate.

7. The process as claimed in claim 6 in which the potassium sulfate is recovered from the solution by crystallization.

8. The process as claimed in claim 1 in which the proportion of ore and sulfuric acid solution is such that the $Al_2O_3$ content of the solution after treatment is less than 70 g. per liter.

9. The process as claimed in claim 1 in which the separated sodium chloride is calcined to dissociate the aluminum chloride contained therewith and is then washed to dissolve off the sodium chloride from the alumina.

10. The process as claimed in claim 1 in which the alumina is calcined at a temperature up to 1,100° C. in order to produce alpha alumina.

11. The process as claimed in claim 1, step 4, in which the iron is precipitated as the double salt of iron and potassium.

12. The process as claimed in claim 11 in which one of the ions of iron and potassium is added to the aqueous wash in the event that the amount thereof is insufficient to precipitate the double sulfate of iron and potassium.

* * * * *

UNITED STATES PATENT OFFICE
CERTIFICATE OF CORRECTION

Patent No. 3,620,671   Dated November 16, 1971

Inventor(s)  Pierre Maurel et al.

It is certified that error appears in the above-identified patent and that said Letters Patent are hereby corrected as shown below:

column 5, line 70, $Fe_2O11$ should be $Fe_2O_3$

Claim 1, line 13, "double" should be inserted before the word sulfates

Signed and sealed this 23rd day of May 1972.

(SEAL)
Attest:

EDWARD M. FLETCHER, JR.
Attesting Officer

ROBERT GOTTSCHALK
Commissioner of Patents